Nov. 13, 1962    M. N. PELLEGRINO ET AL    3,063,164
EDUCATIONAL DEVICE
Filed Nov. 17, 1959
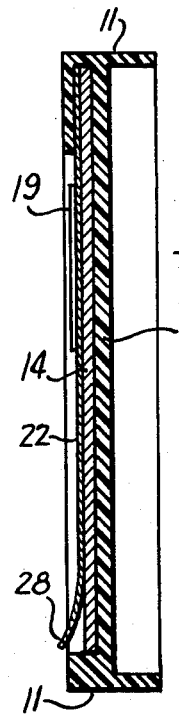
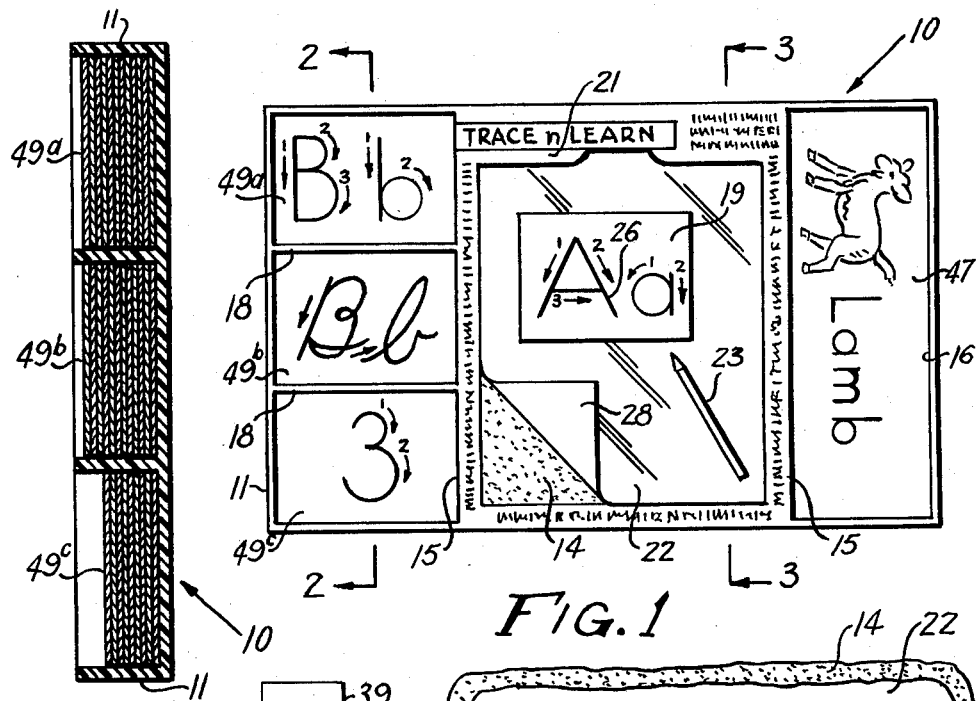
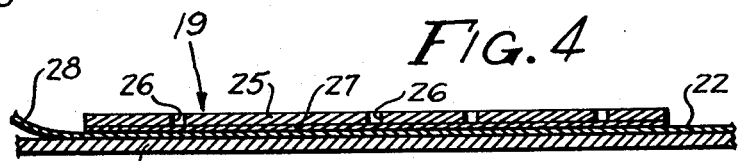
INVENTORS
MICHAEL N. PELLEGRINO
LOUIS N. INNELLI
BY
Arthur P. ...
ATTORNEY

United States Patent Office 3,063,164
Patented Nov. 13, 1962

3,063,164
EDUCATIONAL DEVICE
Michael N. Pellegrino, 219—06 141st Ave., Springfield Gardens, N.Y., and Louis N. Innelli, 53—24 65th Place, Maspeth, N.Y.
Filed Nov. 17, 1959, Ser. No. 853,619
1 Claim. (Cl. 35—66)

This invention relates to an educational device and more particularly to an educational device of the type embodying a slate having a waxed base and a translucent impression sheet overlying the waxed base and adapted to be pressed thereagainst by a stylus or the like to render visible the waxed base at the point or points of adherence of the impression sheet to the base.

It is an object of the present invention to provide an educational device of the character described in which the stylus or other writing implement employed to write on the slate is positively guided in forming the desired reproduction on the slate, whereby the child is taught correct penmanship while writing the letters of the alphabet, or words, or numerals, or the proper artistic strokes in drawing animals, figures, or other characters to be reproduced on the slate.

Another object of this invention is to provide new and improved guiding means having one or more continuous grooves for the stylus or other writing implement employed in connection with a slate and in which each groove is formed to the outline of the letter, word, numeral or other character desired to be reproduced.

Briefly, our invention resides in the combination with a slate having a waxed base and a translucent impression sheet adapted to be pressed against said waxed base by a stylus to render visible the waxed base at the point or points of adherence of the translucent impression sheet; of a guiding member in the form of a sheet or strip adapted to be positioned on the slate and having one or more continuous grooves to receive and guide the writing point of the stylus and transmit the pressure from the writing point of the stylus to the relatively soft translucent impression sheet of the slate, each groove being formed in the outline of the letter, word, numeral or other character desired to be reproduced, whereby reproduction on the slate is effected by tracing movement of the stylus in the groove of the guiding member.

Further objects and advantages of our invention will become more apparent from the following detailed description when taken in conjunction with the accompanying drawing while the features of novelty will be pointed out with more particularlity in the appended claims.

In the drawing in which numerals of like character have been used to designate similar parts throughout the several views, FIG. 1 is a top plan view of a container housing a slate and a plurality of guiding members embodying the present invention.

FIG. 2 is an enlarged sectional view taken along the line 2—2 of FIG 1 as viewed in the direction indicated by the arrows.

FIG. 3 is an enlarged sectional view taken along the line 3—3 of FIG. 1 as viewed in the direction indicated by the arrows.

FIG. 4 is an enlarged fragmentary plan view of a portion of a slate showing one of the guiding members in place thereon and embodying the present invention.

FIG. 5 is an enlarged sectional view taken along the line 5—5 of FIG. 4 as viewed in the direction indicated by the arrows.

FIG. 6 is a plan view of a modified form of stylus-guiding member in accordance with the invention, and FIG. 7 is a sectional view taken along the line 7—7 of FIG. 6.

Referring to the drawing and more particularly to FIG. 1, reference numeral 21 indicates generally a slate of well known construction having a coated wax base 14 and a translucent impression sheet 22 providing a writing or drawing surface for a stylus 23. As is well known with a slate of this type, application of pressure on the translucent impression sheet 22 by the writing point of the stylus 23 in drawing or writing on the surface of the slate will cause adherence of the impression sheet on the coated wax base 14 and render visible the coated base only at the point or points of adherence of the impression sheet. By lifting the translucent impression sheet 22 from the coated base 14, the impression is erased or wiped out and the slate is again ready to be used in the writing or drawing of new characters.

In order to protect the impression sheet 22 from damage by the stylus, it has been found necessary to employ an outer film or sheet of transparent plastic material on which the stylus 23 is adapted to write and the pressure from said outer sheet transmitted to the impression sheet 22. In this manner, the impression sheet 22 which is relatively soft and thin is protected from direct contact with the stylus 23 and the outer transparent sheet can be relatively harder and thicker to increase the effective useful life of the slate.

It is desirable and advantageous in connection with a slate of this type, particularly where the same is to be used as an educational device to teach a child the fundamentals of correct penmanship, or to develop artistic talent, while at the same time provide a source of entertainment for the child, that the stylus be guided in the formation of the desired character on the slate. For this purpose and in accordance with the present invention, a guiding plate such as generally indicated by reference numeral 19 is employed, adapted to be placed on the slate 21.

In the form illustrated, the guiding plate 19 comprises a laminated structure composed of top and bottom sheets 25 and 27, respectively, glued, cemented, or otherwise suitably secured together. The top or upper lamination 25 is formed as a relatively thick sheet of cardboard, plastic, metal or other suitable material to provide a relatively hard or rigid sheet. The lower or bottom lamination 27 on the other hand is formed as a relatively thin sheet of cardboard, plastic, cloth, metal or other suitable material to provide a relatively soft or flexible sheet such that the writing pressure of the stylus will be transmitted to the impression sheet 22 of the slate 21 as hereinafter set forth.

The guiding plate 19 is provided with one or more grooves 26 in the form of a letter, numeral, word, or other character to be reproduced on the slate 21. Each groove 26 is formed as a cut-out slot which extends transversely through the entire thickness of the top lamination 25. Each slot-forming groove 26 is of sufficient width to accommodate the tapered writing point of the stylus 23 and permit the latter to ride freely in the groove and contact the bottom lamination 27, whereby to transmit the writing pressure of the stylus 23 to the impression sheet 28.

In this manner, by simply placing the point of the stylus 23 in the groove 26 of the guiding plate 19 and following the path of the groove longitudinally thereof, the pressure applied by the stylus to the bottom lamination 27 will be transmitted to the impression sheet 28 and cause the latter to become adhered to the wax coated base 14 of the slate to reproduce the character outlined by the groove. Thus, upon removal of the guiding plate 19 from the slate 21, the reproduction of the character outlined by the groove 26 will be rendered visible on the slate.

If desired, directional arrows and other indicia may be provided on the guiding plate 19 adjacent each groove 26 to indicate to the child in tracing the letter, numeral, word or other character formed by the groove and desired to be reproduced on the slate, the direction of tracing movement to be imparted by the stylus 23 in the groove.

It may be desirable and advantageous to have the child observe the formation of the letter, numeral, or other character as it is reproduced upon tracing movement of the stylus 23 in the groove 26. For this purpose, the bottom lamination 27 may be composed of a thin sheet of clear plastic or other suitable transparent material.

Instead of being of laminated construction, the guiding plate may be formed as a single sheet of plastic, metal, or other suitable material of predetermined thickness such as to permit transmission of pressure from the stylus point to the impression sheet on the slate. Such an arrangement is shown in FIGS. 6 and 7 wherein reference numeral 39 designates generally a guide plate formed as a relatively thin sheet of plastic such as acetate or styrene and having one or more grooves 40 formed on one face thereof to accommodate and guide the writing point of the stylus when placed in position on a slate. Each groove 40 may be formed by any suitable process such as molding, pressing, stamping or the like into the desired configuration of the character to be reproduced on the slate.

In this form of our invention, the entire sheet or strip 39 is preferably formed of clear plastic or other suitable transparent material so that the child may observe the effect of the stylus 23 on the impression sheet of the slate as the character outlined by the groove is reproduced.

It will thus be seen that by combining a slate with a novel guiding member for the stylus, a child may be taught the art of correct penmanship, or of correct spelling, or of proper drawing, by simply positioning the guiding member on the slate and tracing the stylus in the groove or grooves of the guiding member.

It will also be apparent that by providing a series of guiding members, a wide variety of subjects may be used for reproduction on the slate such as letters of the alphabet in different styles, numerals, words, pictorial representations and the like, or combinations of any one or more subjects on the same or different guiding members.

It is to be noted further that a positive guide for the stylus is provided by our invention and that the stylus-guiding groove forms an uninterrupted path for tracing movement of the stylus in connection with each character to be reproduced.

The slate 21, stylus 23 and guiding plates 19, 39 may be conveniently housed in a box or container such as indicated generally by reference numeral 10 in FIGS. 1, 2 and 3, formed to provide a central raised platform 13 on which the slate 21 is mounted. Adjacent one side of the platform 13, the box is provided with a number of partitions 18 which form a plurality of relatively small compartments for relatively small guide plates 49a, 49b and 49c, respectively, each of which guide plates or members may be composed of a single sheet as described in connection with FIGS. 6 and 7, or of laminated construction as shown and described in FIGS. 4 and 5. On the opposite side of the platform 13, a single relatively large compartment 16 is provided in the container 10 to accommodate one or more relatively large guiding members 47 which may likewise be of single sheet construction or of laminated construction and which may be provided with grooves depicting animals or other figures or articles accompanied by the word or name for such pictorial representation.

While we have described our invention in connection with a slate, it is to be understood that the same is equally applicable to any other writing surface wherein a pressure responsive impression sheet may be used.

From the foregoing, it is believed that the construction and advantages of our invention may be readily understood by those skilled in the art without further description, it being borne in mind that numerous changes may be made in the details disclosed without departing from the spirit of the invention as set out in the following claims.

What we claim is:

In an educational device of the character described, the combination of a slate having a flat waxed base and a flat translucent impression sheet overlying said base and adapted to adhere thereto upon application of a writing pressure to the upper face of said impression sheet to render visible said base at the point of adherence of said sheet, a stylus having a writing point for applying a writing pressure to said impression sheet, and a plate member adapted to be positioned on said impression sheet, said plate member comprising a laminated structure consisting of a relatively thick and rigid top sheet and a relatively thin and flexible bottom sheet, said plate member having at least one continuous groove formed as a cut-out slot extending transversely through said top sheet to receive and guide the writing point of said stylus, the bottom of said groove being formed by said bottom sheet to transmit a writing pressure to said impression sheet upon application of such writing pressure by the writing point of said stylus, said groove being formed in the outline of a character to be reproduced, whereby reproduction of such character on said slate is accomplished by tracing movement of said stylus in the groove of said plate member.

References Cited in the file of this patent

UNITED STATES PATENTS

| | | |
|---|---|---|
| 1,825,532 | Liebetruth | Sept. 29, 1931 |
| 1,857,009 | Amor | May 3, 1932 |
| 1,989,922 | Heath | Feb. 5, 1935 |
| 2,068,497 | Lorber | Jan. 19, 1937 |
| 2,277,329 | Kimbrough | Mar. 24, 1942 |
| 2,323,521 | De Journette | July 6, 1943 |
| 2,333,597 | Strauss | Nov. 2, 1943 |
| 2,596,890 | Dechert | May 13, 1952 |

FOREIGN PATENTS

| | | |
|---|---|---|
| 498,023 | Great Britain | of 1939 |